(12) United States Patent
Kondou et al.

(10) Patent No.: US 10,663,942 B2
(45) Date of Patent: May 26, 2020

(54) POSITION CONTROL APPARATUS

(71) Applicant: OKUMA Corporation, Niwa-gun Aichi (JP)

(72) Inventors: Hisashi Kondou, Niwa-gun Aichi (JP); Tomohiro Shibata, Niwa-gun Aichi (JP); Yuji Uchida, Niwa-gun Aichi (JP); Takeshi Sakai, Niwa-gun Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 133 days.

(21) Appl. No.: 16/046,213

(22) Filed: Jul. 26, 2018

(65) Prior Publication Data
US 2019/0033818 A1 Jan. 31, 2019

(30) Foreign Application Priority Data
Jul. 31, 2017 (JP) ................. 2017-148209

(51) Int. Cl.
*G05B 19/19* (2006.01)
*G05B 19/416* (2006.01)
*G05B 19/404* (2006.01)

(52) U.S. Cl.
CPC .......... *G05B 19/19* (2013.01); *G05B 19/404* (2013.01); *G05B 19/416* (2013.01);
(Continued)

(58) Field of Classification Search
CPC .... G05B 19/19; G05B 19/404; G05B 19/416; G05B 2219/33133; G05B 2219/49101; G05B 2219/50047
See application file for complete search history.

(56) References Cited

U.S. PATENT DOCUMENTS

| 6,034,498 A * | 3/2000 | Hamamura | .......... | G05B 19/404 |
| | | | | 318/632 |
| 7,560,891 B2 * | 7/2009 | Shibata | ................ | G05B 19/404 |
| | | | | 318/560 |

(Continued)

FOREIGN PATENT DOCUMENTS

JP          2016076119 A         5/2016

*Primary Examiner* — Abdelmoniem I Elamin
(74) *Attorney, Agent, or Firm* — Cantor Colburn LLP (57) ABSTRACT

A position control apparatus includes an inversion detector which detects an inversion of a position command and generates an inversion detection signal, a deflection characteristic storage unit which stores a deflection characteristic representing an amount of deflection with respect to a torque command, and an inversion correction calculator which calculates an inversion correction amount. The inversion correction calculator stores a torque command immediately before the inversion, and calculates the inversion correction amount from a difference between an amount of deflection immediately before inversion in which the stored torque command is checked with the deflection characteristic, and an amount of deflection after the inversion in which a value obtained by inverting a sign of the stored torque command is checked with the deflection characteristic. A value obtained by adding the inversion correction amount to the position command value is used for position error calculation.

3 Claims, 9 Drawing Sheets

(52) U.S. Cl.
CPC .............. *G05B 2219/33133* (2013.01); *G05B 2219/49101* (2013.01); *G05B 2219/50047* (2013.01)

(56) References Cited

U.S. PATENT DOCUMENTS

| | | | | |
|---|---|---|---|---|
| 7,634,955 | B2 * | 12/2009 | Osaki | G05B 19/402 |
| | | | | 269/73 |
| 8,452,425 | B2 * | 5/2013 | Kawazu | G05B 11/42 |
| | | | | 700/56 |
| 8,504,307 | B2 * | 8/2013 | Norihisa | G05B 19/4065 |
| | | | | 702/158 |
| 8,508,171 | B2 * | 8/2013 | Miyaji | G05B 19/404 |
| | | | | 318/560 |
| 9,501,054 | B2 * | 11/2016 | Nakamura | G05B 19/19 |
| 10,008,963 | B2 * | 6/2018 | Sakai | G05B 19/404 |
| 10,108,177 | B2 * | 10/2018 | Fujita | G05B 11/32 |
| 2007/0194740 | A1 * | 8/2007 | Shibata | G05B 19/404 |
| | | | | 318/632 |
| 2012/0194121 | A1 * | 8/2012 | Miyaji | G05B 19/404 |
| | | | | 318/615 |
| 2015/0295522 | A1 * | 10/2015 | Sakai | G05B 19/404 |
| | | | | 318/631 |
| 2016/0098031 | A1 | 4/2016 | Ikai et al. | |
| 2017/0083007 | A1 * | 3/2017 | Oda | G05B 19/4166 |

\* cited by examiner

POSITION CONTROL APPARATUS

CROSS REFERENCE TO RELATED APPLICATION

The present application claims priority under 35 U.S.C. § 119 to Japanese Patent Application No. 2017-148209 filed on Jul. 31, 2017, the content of which is incorporated herein by reference.

TECHNICAL FIELD

The present disclosure relates to a position control apparatus that controls a position of a table on which a subject to be machined is mounted or a headstock, during cut-feeding.

BACKGROUND

Figure 1:
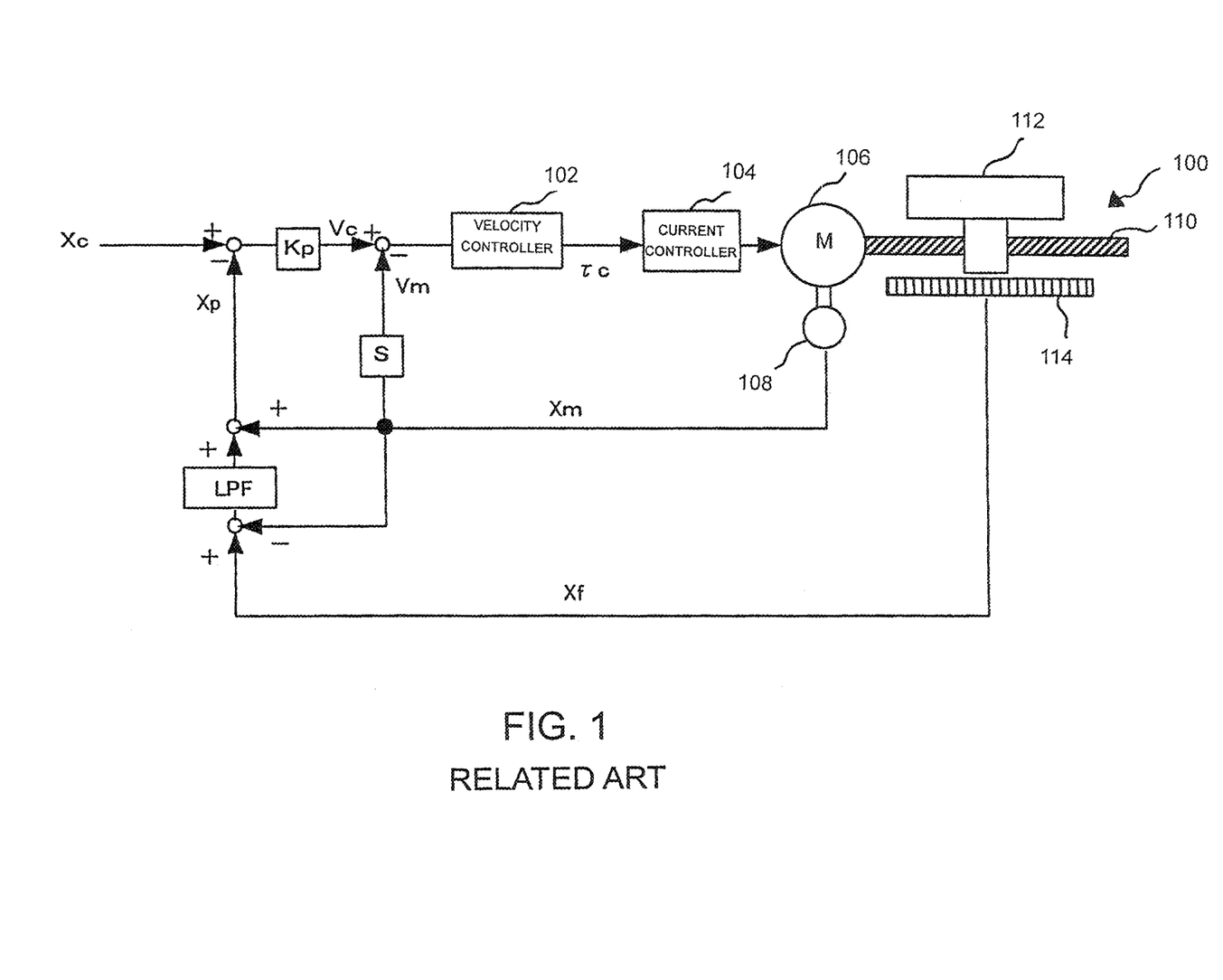
FIG. 1 is a block diagram of a position control apparatus according to the related art.

FIG. 1 shows an example structure of a position control apparatus of the related art.

A position control apparatus 100 receives, from an upper-level, numerical control apparatus (NC apparatus) or the like, a position command value Xc for each sampling period. A position feedback value Xp is subtracted from the position command value Xc, and the result is multiplied by a position loop gain Kp, to calculate a motor velocity command value Vc. A velocity detection value Vm is subtracted from the motor velocity command value Vc, to obtain an input of a velocity controller 102, which then calculates a torque command value τc. A current controller 104 controls a motor current so that a motor 106 generates a torque corresponding to the torque command value τc. The motor 106 is supplied with the current controlled by the controller 104, to generate a torque, and rotates. A rotary encoder 108 coupled to the motor 106 detects a rotational position of the motor. The velocity detection value Vm is calculated from a difference in the detected value for each sampling period. A table 112 coupled to the motor 106 via a ball screw 110 moves linearly in response to the rotation of the motor 106. An optical scale 114 reads a displacement of a bed and the table 112, and calculates a position Xf (hereinafter referred to as "scale position Xf") of the table 112 based on the displacement. When a rigidity of a feeding mechanism is sufficiently high, the motor control apparatus can use the scale position Xf as the position feedback value Xp without further processing. However, in a large-size machine such as a planar type machine tool, the rigidity of the feeding mechanism tends to be low, and the scale position Xf tends to have a large phase delay with respect to the position Xm (hereinafter referred to as "motor position Xm") of the table calculated from the rotational position of the motor 106. As a result, the control may become unstable; for example, vibration may be generated in the position feedback loop. In consideration of this, a value obtained by low-pass filter processing a difference between the motor position Xm and the scale position Xf, to remove a high frequency component, is added to Xm, to obtain Xp.

JP 2016-076119 A discloses a motor control apparatus which detects a position of a table of a machine tool by an encoder which detects a rotational position of a driving motor and a scale which detects the position of the table.

Figure 2:
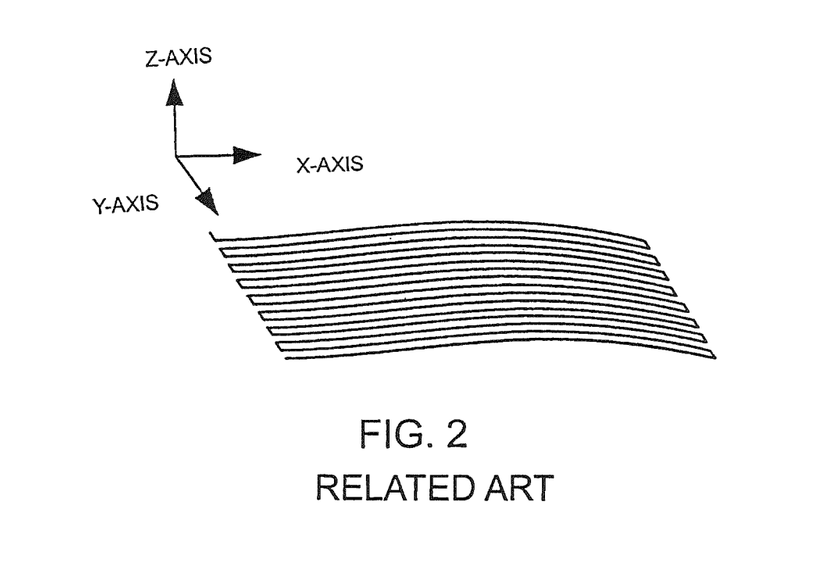
FIG. 2 is a diagram showing an example die machining operation.
Figure 3:
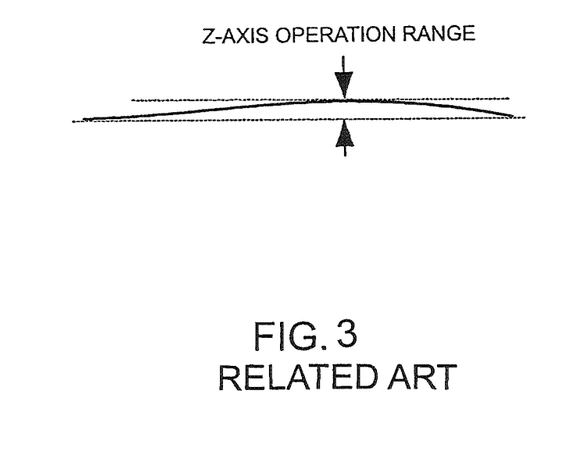
FIG. 3 is an enlarged view of one path of the die machining operation.

In a machining path of die machining or the like, in the operation for each axis, there may be cases where reciprocation of a very small section sequentially appears. In an example die machining shown in FIG. 2, with a Y-axis being a pick direction, cutting is executed by operations on an X-axis and a Z-axis. In this case, an operation range for the X-axis is large, and, as a consequence, a velocity for the X-axis is also high. On the other hand, in the Z-axis, the operation range is small, and, consequently, the velocity is small (FIG. 3).

Figure 4:
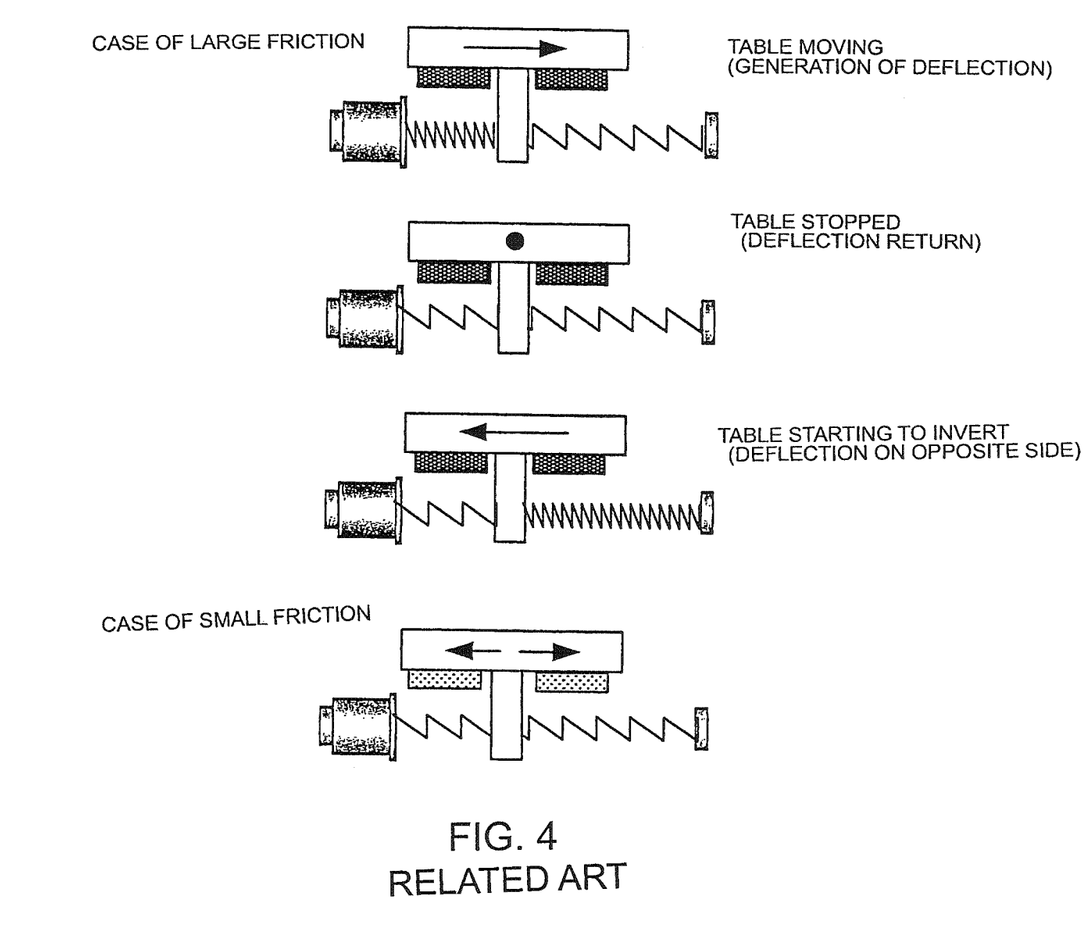
FIG. 4 is a diagram showing an image of an increase in friction and a deflection of a ball screw.
Figure 5:
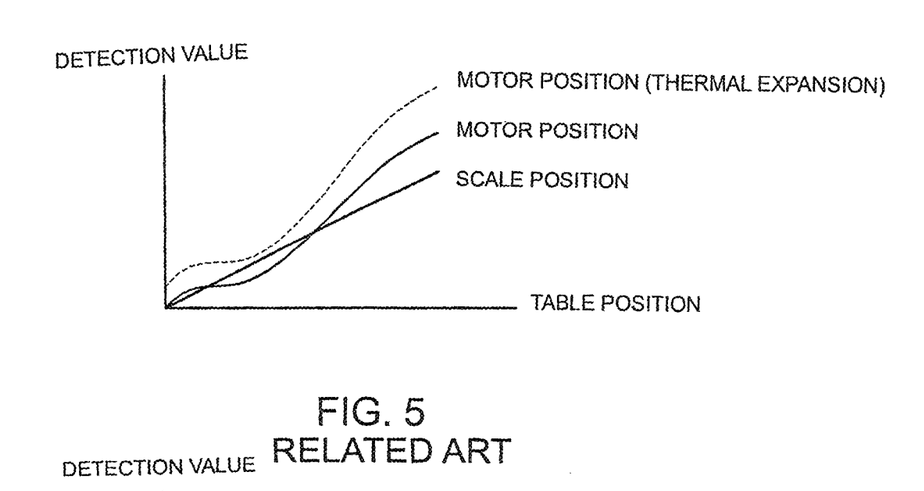
FIG. 5 is a diagram showing a displacement of a scale position and a motor position.

In a machining path having a small operation range and a small velocity for a certain axis, there may be cases where lubrication insufficiency is generated in a driving system. In particular, in a case where the table is guided by a friction guide surface, if the machining path is such that a very small section is reciprocated with a low velocity, lubrication becomes insufficient on the friction guide surface, and a coefficient of friction tends to be increased. When the coefficient of friction is increased, a sliding resistance applied on the table is also increased. When the sliding resistance is increased, a table driving system such as a ball screw or the like is elastically deformed (deflection is generated), and thus, a relative displacement between the table position and the motor position is increased (FIG. 4).

The increase in a position error appears as a streak on the machined surface. As such a streak would require additional machining, this is uneconomical.

As a method of reducing an inversion delay, a method exists in which an amount of correction corresponding to a frictional force corresponding to a movement direction is added during calculation of a velocity error.

With the correction, during the inversion, the motor is inverted before the table. When the sliding resistance is small and the deflection is small, the table starts to invert quickly after the motor. However, when the sliding resistance is large and the deflection is large, because the motor position Xm is inverted by a correction value Vd, a position error calculation result of the position feedback is reduced, and the increase in the velocity command Vc is suppressed. On the other hand, because the velocity Vm is already inverted by the inversion operation of the motor, the increase in the velocity error is further suppressed, and the increase in the torque τc is suppressed. As a result, a delay is caused until the motor moves to resolve the deflection, and a delay is also caused until a sufficient torque for inverting the table is generated against the frictional force after the movement. During this delay, the position command Xc continues to progress, and a follow delay is caused in the scale position Xf. If the amount of correction is set large corresponding to a case where the sliding resistance is large, the amount of correction becomes excessive when the sliding resistance is small, causing an overshoot of the position of the table, which then causes a position error. Thus, an excessive setting is not possible.

In consideration of this, in the related art, a method is proposed in which the amount of correction is calculated by setting "(deviation between a scale position and a motor position)/(torque command value)" as rigidity (=an inverse of a spring constant), and calculating:

Amount of Correction=(initial deviation in first direction/corresponding torque command value in the first direction)×current torque command value−"current deviation."

Figure 6:
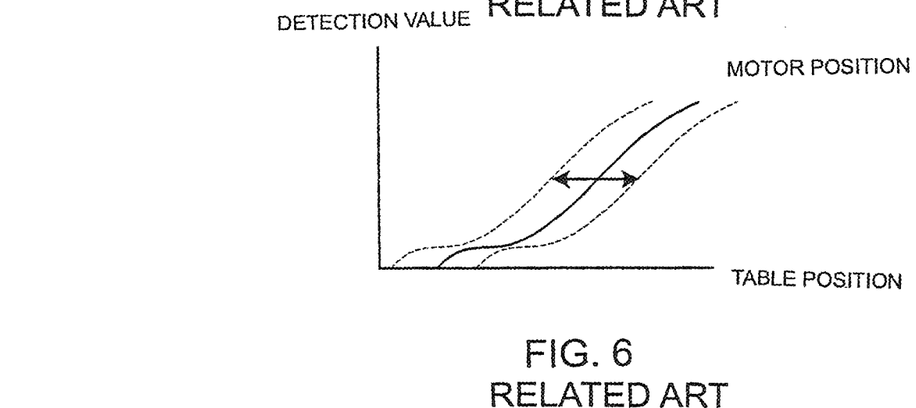
FIG. 6 is a diagram showing a change of a motor position by a sliding resistance.
Figure 7:
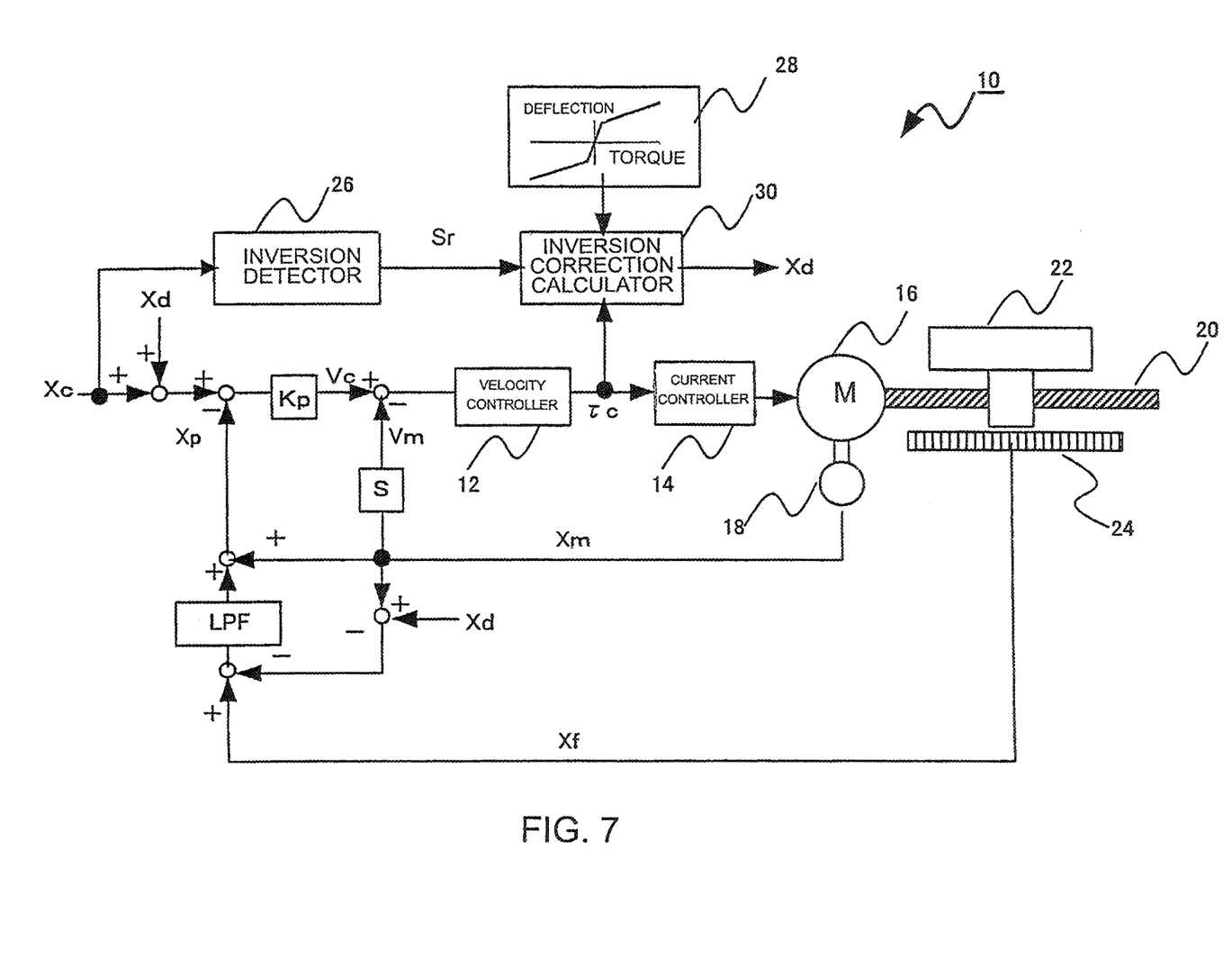
FIG. 7 is a schematic block diagram of a position control apparatus according to an embodiment of the present disclosure.

However, because there is a pitch error in the ball screw, as shown in FIG. 7, the deviation between the scale position and the motor position differs for each position of the table. In particular, when a stroke is long such as in the case of a planar type machine tool, the deviation may vary by a value exceeding 100 microns. Further, in the ball screw, the motor position changes as shown in FIG. 6, due to thermal expansion. The "initial deviation" and the "current deviation" presumed in the above calculation may fail to be reproduced, even for the same torque command value. Thus, there has been a problem in that the correction advantage cannot be stably achieved.

SUMMARY

According to one aspect of the present disclosure, there is provided a position control apparatus that controls a position of a movable part of a machine tool based on a position command value from an upper-level, numerical control apparatus, the position control apparatus comprising: a position control loop that acquires a position of the movable part, and that executes a position feedback using a value based on the acquired position of the movable part as a position feedback value; and a velocity control loop that calculates a torque command value for a motor, which drives the movable part via a drive force transmission system including a ball screw, based on a velocity command value calculated by the position control loop, and that controls a velocity of the motor, wherein the position control apparatus further comprises: an inversion detector that detects an inversion of a direction of the position control value; a storage unit that stores a deflection characteristic which is a correspondence relationship between the torque command value and an amount of deflection of the drive force transmission system; and an inversion compensation calculator that acquires the amount of deflection immediately before inversion by applying the deflection characteristic on a torque command value immediately before the inversion, that estimates the amount of deflection immediately after the inversion by applying the deflection characteristic on a value calculated by inverting a sign of the torque command value immediately before the inversion, and that calculates an inversion compensation amount which is a difference between the amount of deflection immediately before the inversion and the estimated amount of deflection, and wherein when the inversion detector detects the inversion of the direction of the position command value, the position is controlled using, as a new position command value, a value obtained by adding the inversion compensation amount to the position command value.

According to another aspect of the present disclosure, there is provided a position control apparatus that controls a position of a movable part of a machine tool based on a position command value from an upper-level, numerical control apparatus, the position control apparatus comprising: a position control loop that low-pass filter processes a difference between a position of the movable part based on a detection value of a rotary encoder which detects a position of a motor which drives the movable part via a drive force transmission system including a ball screw, and a position of the movable part based on a detection value of a scale which detects a position of the movable part, and that executes position feedback using, as a position feedback value, a value obtained by adding the low-pass filter processed value to the position of the movable part based on the detection value of the rotary encoder; and a velocity control loop that calculates a torque command value for the motor based on a velocity command value calculated by the position control loop, and that controls a velocity of the motor, wherein the position control apparatus further comprises: an inversion detector that detects an inversion of a direction of the position command value; a storage unit that stores a deflection characteristic which is a correspondence relationship between the torque command value and an amount of deflection of the drive force transmission system; and an inversion compensation calculator that acquires the amount of deflection immediately before inversion by applying the deflection characteristic on a torque command value immediately before the inversion, that estimates the amount of deflection immediately after the inversion by applying the deflection characteristic on a value calculated by inverting a sign of the torque command value immediately before the inversion, and that calculates an inversion compensation amount which is a difference between the amount of deflection immediately before the inversion and the estimated amount of deflection, and wherein when the inversion detector detects the inversion of the direction of the position command value, the position is controlled using, as a new position command value, a value obtained by adding the inversion compensation amount to the position command value, and further using, as a new position feedback value, a value obtained by adding a value obtained by low-pass filter processing the inversion compensation amount to the position feedback value.

According to another aspect of the present disclosure, there is provided a position control apparatus that controls a position of a movable part of a machine tool based on a position command value from an upper-level, numerical control apparatus, the position control apparatus comprising: a position control loop that acquires a position of the movable part based on a detection value of a rotary encoder which detects a position of a motor which drives the movable part via a drive force transmission system including a ball screw, and that executes position feedback using, as a position feedback value, the acquired position of the movable part; and a velocity control loop that calculates a torque command value for the motor based on a velocity command value calculated by the position control loop, and that controls a velocity of the motor, wherein the position control apparatus further comprises: an inversion detector that detects an inversion of a direction of the position command value; a storage unit that stores a deflection characteristic which is a correspondence relationship between the torque command value and an amount of deflection of the drive force transmission system; and an inversion compensation calculator that acquires the amount of deflection immediately before inversion by applying the deflection characteristic on a torque command value immediately before the inversion, that estimates the amount of deflection immediately after the inversion by applying the deflection characteristic on a value calculated by inverting a sign of the torque command value immediately before the inversion, and that calculates an inversion compensation amount which is a difference between the amount of deflection immediately before the inversion and the estimated amount of deflection, and wherein when the inversion detector detects the inversion of the direction of the position command value, the position is controlled using, as a new position command value, a value obtained by adding the inversion compensation amount to the position command value.

Advantageous Effects of Invention

During inversion, the deflection of the drive force transmission system such as the ball screw is cancelled by the motor and the motor is quickly progressed to a position of deflection in the opposite direction, so that the delay during inversion is suppressed.

BRIEF DESCRIPTION OF DRAWINGS

Embodiment(s) of the present disclosure will be described by reference to the following figures, wherein.

DESCRIPTION OF EMBODIMENTS

FIG. 7 is a schematic block diagram of a position control apparatus 10 according to an embodiment of the present disclosure. FIG. 7 also shows a table of a machine tool to be controlled, and a mechanism which drives the table. The position control apparatus 10 first receives a position command value Xc generated for each sampling period by an upper-level, NC apparatus (not shown), subtracts a position feedback value Xp from the position command value Xc, and multiplies the result by a position loop gain Kp, to calculate a motor velocity command value Vc. The position control apparatus 10 has a velocity control loop that subtracts a velocity detection value Vm from the motor velocity command value Vc, that sets the result as an input of a velocity controller 12, and calculates a torque command value τc by the velocity controller 12. Further, a current controller 14 controls a motor current such that a motor 16 generates a torque corresponding to the torque command value τc. The motor 16 generates a torque by the current controlled by the current controller 14, and drives a ball screw 20. A rotary encoder 18 coupled to the motor 16 detects a motor position. The velocity detection value Vm is calculated from a difference in the detection value for every sampling period. A table 22 coupled to the motor 16 via the ball screw 20 linearly moves in response to the rotation of the motor 16. A scale 24 such as an optical scale reads a position of the table 22, and outputs a scale position Xf. The position control apparatus 10 has a position control loop that low-pass filter processes a difference between the motor position Xm and the scale position Xf to remove a high frequency component, and that adds the result to the motor position Xm to obtain a position feedback value Xp. The position control apparatus 10 further comprises an inversion detector 26 that detects an inversion of the position command value Xc and that generates an inversion detection signal Sr, a deflection characteristic storage unit 28 that stores a deflection characteristic representing a relationship of an amount of deflection with respect to a torque command value, and an inversion correction calculator 30 that generates an inversion correction amount Xd.

The inversion correction calculator 30 reads the torque command τc and the deflection characteristic, and generates the inversion correction amount Xd based on these values, at a timing corresponding to a timing of reception of the inversion detection signal Sr transmitted from the inversion detector 26.

The inversion correction amount Xd is added to the position command value Xc, and the summed value is used as a new position command for a position error calculation. Further, the inversion correction amount Xd is low-pass filter processed and added to the feedback value Xp, and the summed value is set as a new feedback value Xp.

Figure 8:
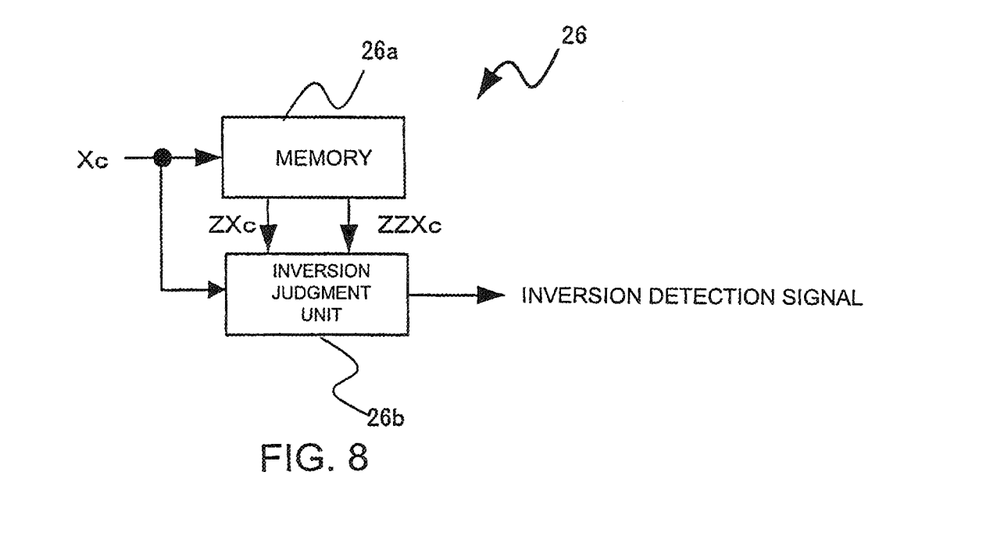
FIG. 8 is a block diagram of an inversion detector.
Figure 9:
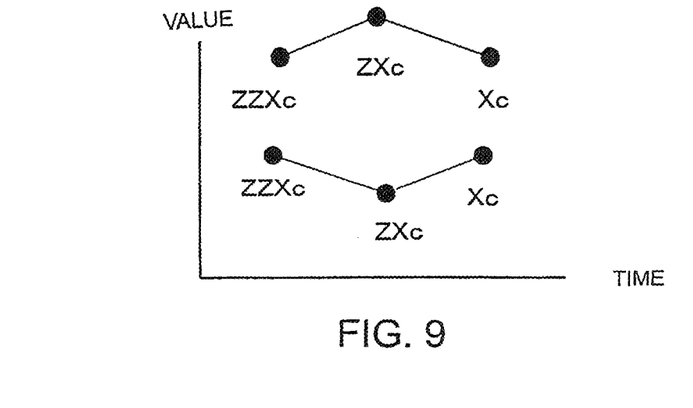
FIG. 9 is a diagram showing an inversion detection pattern of the inversion detector.

The inversion detector 26 can be formed as shown in FIG. 8. The inversion detector 26 comprises a memory 26a which stores the position command value Xc, a position command value ZXc of one sampling period before, and a position command value ZZXc of two sampling periods before. The inversion detector 26 further comprises an inversion judgement unit 26b which generates the inversion detection signal Sr when the relationship of the magnitudes of the position command values Xc, ZXc, and ZZXc becomes a pattern as shown in FIG. 9; that is, when the position command value changes from increasing to decreasing or from decreasing to increasing.

Figure 10:
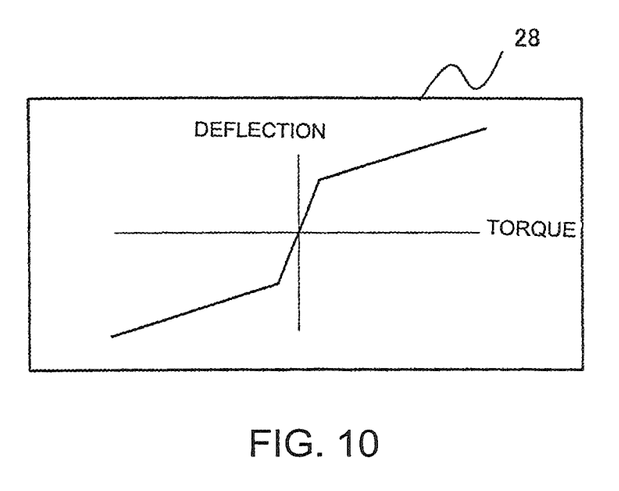
FIG. 10 is an explanatory diagram of a deflection characteristic.

The deflection characteristic can be represented, for example, as shown in FIG. 10. The torque command value is shown on a horizontal axis, the corresponding amount of deflection is shown on a vertical axis, the torque command value and the amount of deflection are correlated to each other, and the relationship therebetween is stored in the deflection characteristic storage unit 28 as a correspondence table or a function. Based on the correspondence, the amounts of deflection when the torque command value is positive and when the torque command value is negative can be read.

Figure 11:
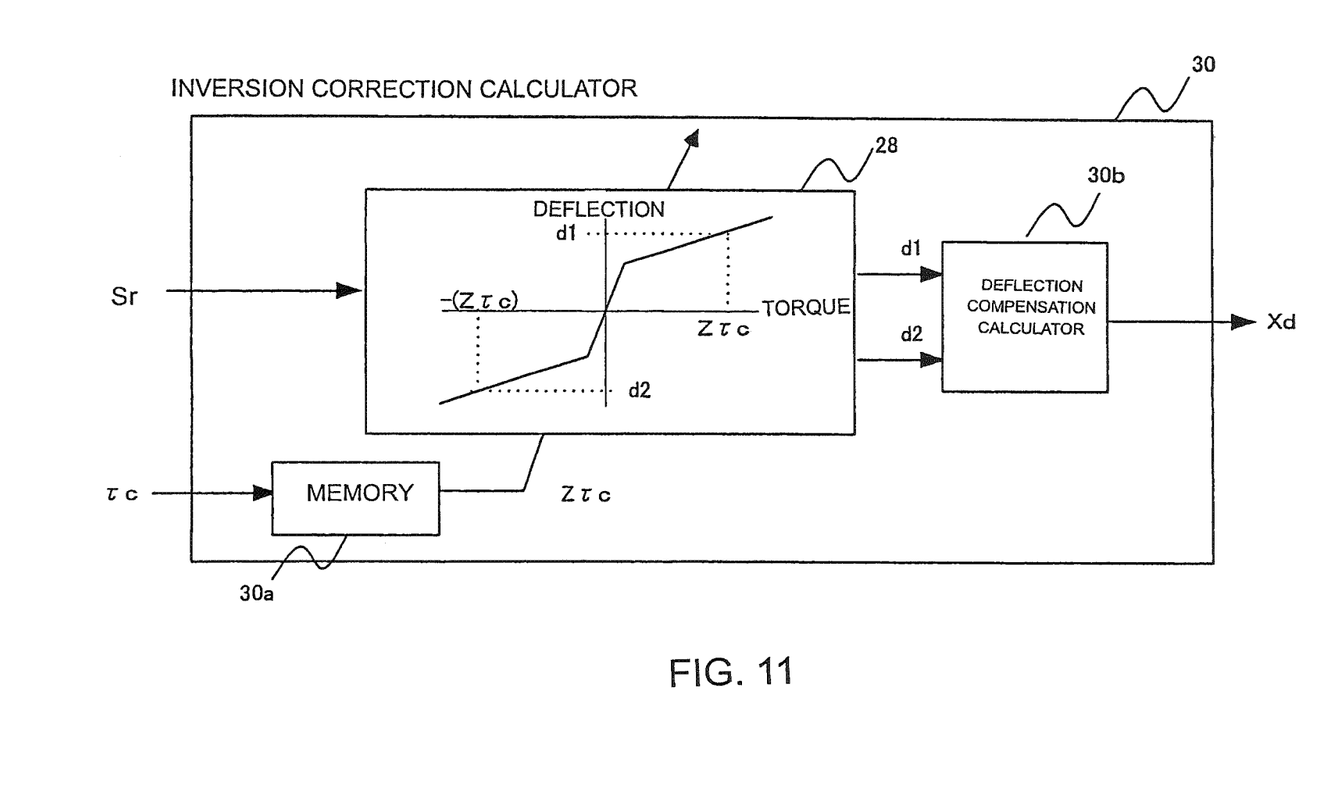
FIG. 11 is a block diagram of an inversion correction calculator.

The inversion correction calculator 30 can be formed as shown in FIG. 11. A memory 30a stores the torque command τc, and outputs a torque command Zτc of one sampling before. At a reception timing of the inversion detection signal Sr, the torque command Zτc before the inversion is checked with the deflection characteristic to read an amount of deflection d1 before the inversion, an inverted value −Zτc in which a sign of the torque command Zτc before the inversion is inverted is checked with the deflection characteristic to estimate an amount of deflection d2 after the inversion, and a deflection compensation calculator 30b calculates (d2−d1) to calculate the inversion correction amount Xd.

By forming the units in this manner, an amount of deflection can be corrected corresponding to the frictional force which changes with time by the operation of the apparatus.

Further, for an on-site adjustment according to a machine state and a machining target, the inversion correction amount Xd may be increased or decreased. Specifically, the apparatus is configured to multiply the inversion correction amount Xd by an adjustable gain parameter, so that a correction level can be manually adjusted by adjusting the gain parameter.

Figure 12:
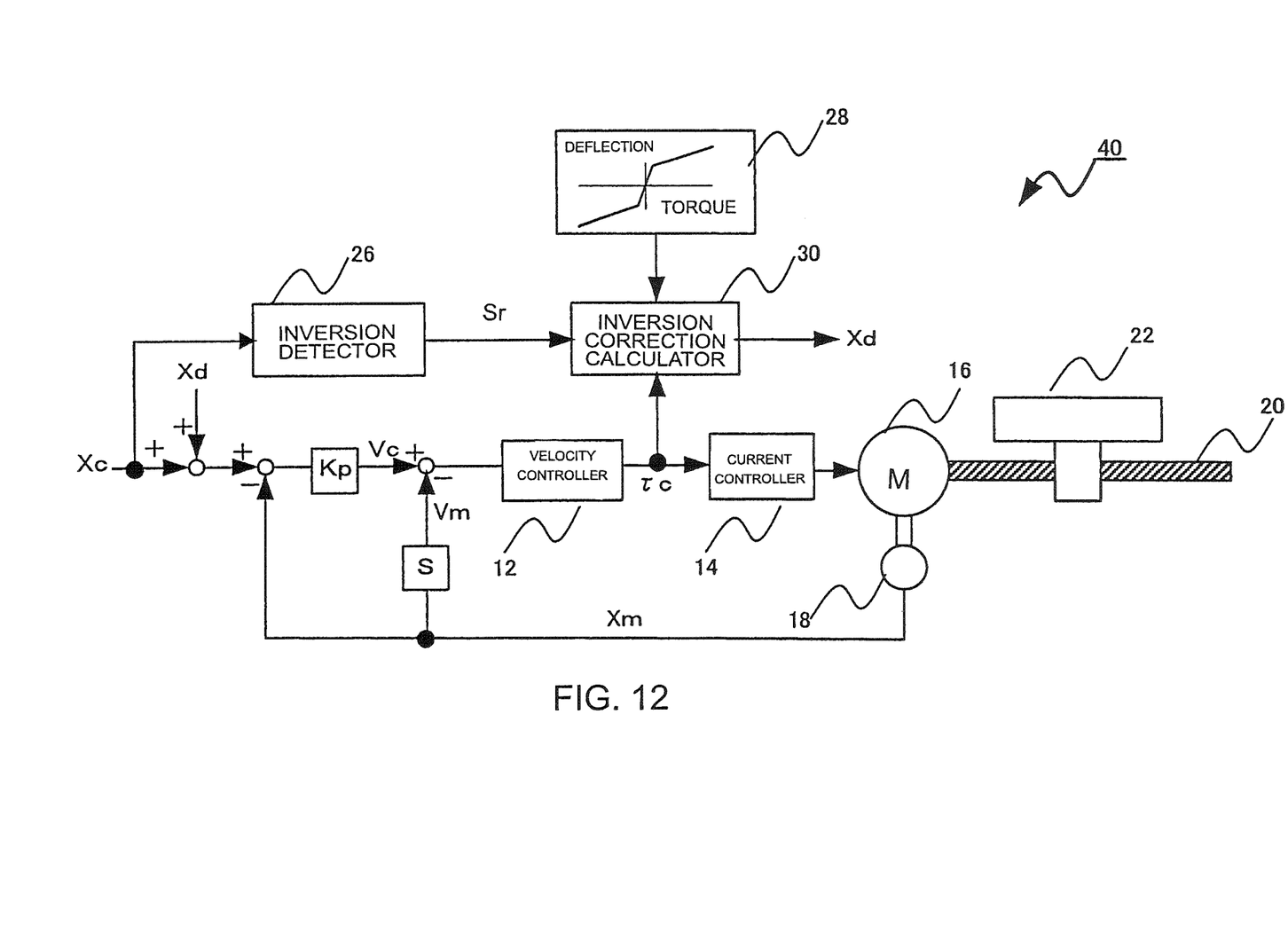
FIG. 12 is a schematic block diagram of a position control apparatus according to another embodiment of the present disclosure.

FIG. 12 shows a position control apparatus 40 according to another embodiment of the present disclosure.

The position control apparatus 40 is an apparatus in which the scale 24 is omitted from the position control apparatus 10 described above, and the position feedback control is executed by the motor position Xm. As the relationship between the friction and the deflection is identical to that in the case of the position control apparatus 10, the inversion correction calculator 30 similar to that shown in FIG. 11 is provided. The amount of deflection d1 immediately before inversion is determined from the torque Zτc immediately before the inversion, the amount of deflection d2 at the torque −Zτc predicted after the inversion is added as the inversion correction amount to the position command, and during this period, the motor is quickly advanced. In this manner, the inversion delay of the table position can be suppressed even in the case where there is no scale.

The position control apparatus 40 has a position control loop which uses the motor position Xm for the position feedback in place of the position feedback value Xp in the position control apparatus 10 described above. The other structures; that is, the position command value Xc, the position loop gain Kp, the motor velocity command value Vc, the velocity detection value Vm, the velocity controller 12, the torque command value τc, the current controller 14, the motor 16, the rotary encoder 18, the ball screw 20, and the table 22, are similar to those of the embodiment shown in FIG. 7. The position control apparatus 40 comprises the inversion detector 26 that detects the inversion of the position command value Xc and that generates the inversion detection signal Sr, the deflection characteristic representing the relationship of the amount of deflection with respect to the torque command value, and the inversion correction calculator 30 that generates the inversion correction amount Xd.

The inversion correction calculator 30 reads the torque command τc and the deflection characteristic, and calculates the inversion correction amount Xd at a timing corresponding to the reception timing of the inversion detection signal Sr.

A value obtained by adding the inversion correction amount Xd to the position command value Xc is set as a new position command, and used for the position error calculation.

The inversion detector 26 has a structure similar to that shown in, for example, FIG. 8, and the judgment of the inversion is similarly executed based on the pattern as shown in FIG. 9. The deflection characteristic is similar to, for example, that shown in FIG. 10, and the inversion correction amount calculator 30 is similar to, for example, that shown in FIG. 11.

The invention claimed is:

1. A position control apparatus that controls a position of a movable part of a machine tool based on a position command value from an upper-level, numerical control apparatus, the position control apparatus comprising:
    a position control loop that acquires a position of the movable part, and that executes a position feedback using a value based on the acquired position of the movable part as a position feedback value; and
    a velocity control loop that calculates a torque command value for a motor, which drives the movable part via a drive force transmission system including a ball screw, based on a velocity command value calculated by the position control loop, and that controls a velocity of the motor, wherein
    the position control apparatus further comprises:
    an inversion detector that detects an inversion of a direction of the position command value;
    a storage unit that stores a deflection characteristic which is a correspondence relationship between the torque command value and an amount of deflection of the drive force transmission system; and
    an inversion compensation calculator that acquires the amount of deflection immediately before inversion by applying the deflection characteristic on a torque command value immediately before the inversion, that estimates the amount of deflection immediately after the inversion by applying the deflection characteristic on a value calculated by inverting a sign of the torque command value immediately before the inversion, and that calculates an inversion compensation amount which is a difference between the amount of deflection immediately before the inversion and the estimated amount of deflection, and wherein
    when the inversion detector detects the inversion of the direction of the position command value, the position is controlled using, as a new position command value, a value obtained by adding the inversion compensation amount to the position command value.

2. The position control apparatus according to claim 1, wherein
    the position control loop low-pass filter processes a difference between the position of the movable part based on a detection value of a rotary encoder which detects the position of the motor and the position of the movable part based on a detection value of a scale which detects the position of the movable part, and executes the position feedback using, as a position feedback value, a value obtained by adding the low-pass filter processed value to the position of the movable part based on the detection value of the rotary encoder, and
    when the inversion detector detects the inversion of the direction of the position command value, the position is controlled further using, as a new position feedback value, a value obtained by adding a value obtained by low-pass filter processing the inversion compensation amount to the position feedback value.

3. The position control apparatus according to claim 1, wherein
    the position control loop acquires the position of the movable part based on a detection value of a rotary encoder which detects the position of the motor, and executes the position feedback using, as a position feedback value, the acquired position of the movable part.

* * * * *